United States Patent [19]

Hartwick

[11] 4,061,478
[45] Dec. 6, 1977

[54] SELF-CLEANING SMOKE FILTER

[76] Inventor: George J. Hartwick, 3733 N. Sheridan Road, Waukegan, Ill. 60085

[21] Appl. No.: 581,531

[22] Filed: May 28, 1975

Related U.S. Application Data

[63] Continuation-in-part of Ser. No. 484,285, June 28, 1974, abandoned.

[51] Int. Cl.² .............................................. B01D 47/06
[52] U.S. Cl. ................................. 55/257 PV; 55/440; 55/444; 261/118
[58] Field of Search ............... 55/229, 239, 242, 257, 55/440, 442, 443, 464, DIG. 37, 444; 261/17, 90, 108, 111, 118; 60/310

[56] References Cited

U.S. PATENT DOCUMENTS

| 760,674 | 5/1904 | Winand | 261/111 |
|---|---|---|---|
| 885,185 | 4/1908 | Serrell | 55/227 |
| 908,388 | 12/1908 | Braemer | 55/257 PV |
| 1,047,765 | 12/1912 | Derby | 55/257 PV |
| 1,142,483 | 6/1915 | Bloom et al. | 55/257 PV |
| 1,223,082 | 4/1917 | Lissaver | 55/440 |
| 1,639,179 | 8/1927 | Hamel | 261/17 |
| 3,812,658 | 5/1974 | Arnold et al. | 55/239 |
| 3,880,624 | 4/1975 | Arnold et al. | 55/257 PV |

FOREIGN PATENT DOCUMENTS

| 76,807 | 5/1917 | Switzerland | 261/118 |

Primary Examiner—Frank W. Lutter
Assistant Examiner—David L. Lacey
Attorney, Agent, or Firm—Hill, Gross, Simpson, Van Santen, Steadman, Chiara & Simpson

[57] ABSTRACT

A self-cleaning smoke filter is disclosed. The filter includes a channel having a plurality of longitudinal sides angularly disposed relative to the horizontal, an inlet port for receiving gaseous emissions contaminated by particulate matter and other pollutants, and an outlet port. The filter further includes spraying means for producing a cleansing spray inside said channel, and serpentine baffle means, angularly disposed relative to the horizontal, disposed inside said channel in advance of said outlet exit port.

18 Claims, 6 Drawing Figures

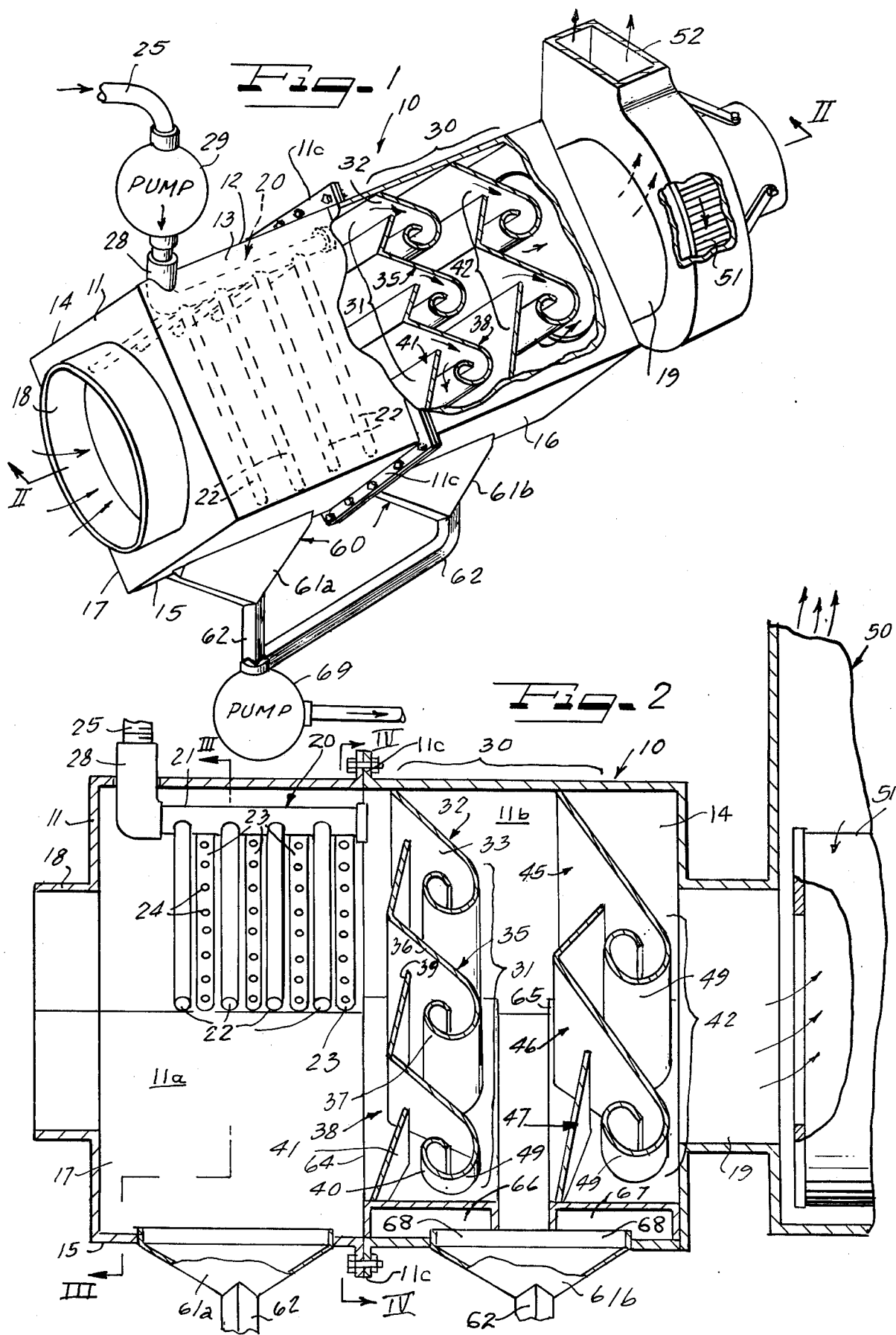

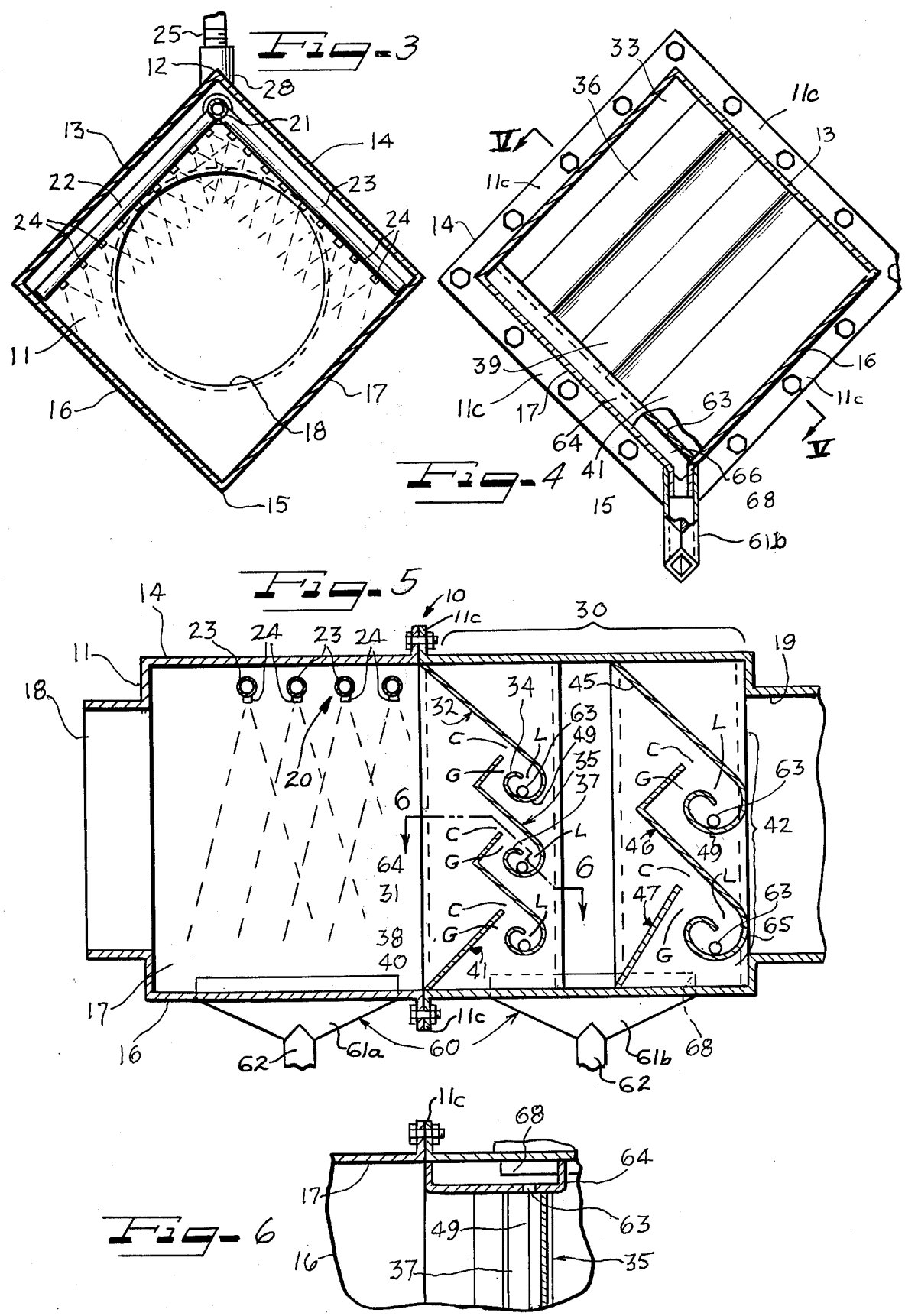

SELF-CLEANING SMOKE FILTER

RELATED APPLICATION

This application is a continuation in part of application, Ser. No. 484,285, filed June 28, 1974, and now abandoned

BACKGROUND OF THE INVENTION

This invention relates to an apparatus for removing or filtering contaminants from a gaseous emission such as smoke. More particularly, this invention relates to such devices which are preferably disposed in advance of a stack or some similar outlet, whereby certain contaminants are removed before the gaseous emissions escape into the ambient air.

At the present time, particularly in view of the well-known effort to prevent further degradation of the environment, it would be very desirable to provide economical means for removing contaminants, such as particulate matter and other pollutants, from gaseous emissions prior to their escape into the biosphere. Numerous devices have been suggested for this purpose with varying degrees of success. Some of these devices have utilized an array of traps through which gaseous emissions are circulated en route to a stack. As the gaseous emissions pass through these traps, the associated particulate matter adheres thereto, permitting the gaseous emissions to enter the stack substantially free from the contaminating particulate matter. In some prior art embodiments, the gaseous emissions are subjected to a liquid spray in advance of the traps so that, among other things, the particulate matter will adhere to the traps more readily.

Though many of these prior art devices have successfully removed particulate matter and other pollutants from gaseous emissions, some of them are subject to the undesirable effect of particulate buildup. More particularly, as gaseous emissions are continuously circulated, the amount of trapped particulate matter tends to increase. If this particulate matter is not removed, the traps can become coated with layers of particulate material which can clog the traps and interfere with the proper circulation of the gaseous emissions. Moreover, in some prior art embodiments utilizing a liquid spray in advance of the traps, a portion of the spray undesirably passes therethrough and into the stack.

BRIEF DESCRIPTION OF AN EXEMPLARY EMBODIMENT

The apparatus of the invention overcomes these and other drawbacks in the prior art by providing a device which not only removes particulate matter and other pollutants from gaseous emissions, but prevents particulate buildup in a novel, self-cleaning smoke filter. Moreover, because of the unique design of the smoke filter of the invention, water from the liquid spray is precluded from undesirably entering the stack.

In accordance with one exemplary embodiment of the invention, the apparatus includes a channel whose longitudinal sides are angularly disposed relative to the horizontal, an inlet port for receiving a gaseous emission contaminated by particulate matter and other pollutants, and an outlet port, preferably opening into a stack or some other outlet to the ambient air. The embodiment illustrated further includes multiple spraying means for preferably producing a pressurized cleansing spray inside the channel, and serpentine baffle means, disposed inside the channel in advance of the outlet port, which are angularly disposed relative to the horizontal. Exhaust means, cooperating with the channel, for drawing gaseous emissions therethrough are also provided.

In accordance with a primary object of the invention, pollutants associated with the gaseous emissions are removed by the multiple spraying means prior to their appearance at the baffle means. Moreover, the baffle means, because of their unique angular construction, prevent any portion of the cleansing spray from passing through the baffles and into the stack. To promote passage of the gaseous emissions through the baffles and into the stack, exhaust means, such as a centrifugal impeller fan, are also provided.

In accordance with another object of this invention, the angularly disposed sides of the channel and the angularly disposed baffle means cause initially unremoved particulate matter associated with the gaseous emissions to be trapped by, and then washed down, the baffle means. As a result, the particulate matter does not build up, and proper circulation of the gaseous emissions through the channel is maintained. Further, drains are provided at the bottom of the channel which, in accordance with another object of the invention, remove the cleansing spray, the particulate matter and other pollutants from the channel. Other objects, features and advantages of the invention will be apparent upon reading the following detailed description in conjunction with the accompanying drawings.

BRIEF DESCRIPTION OF THE DRAWINGS

FIG. 1 is a perspective view, partially cutaway, of a self-cleaning smoke filter comprising the invention.

FIG. 2 is an enlarged, sectional view of the self-cleaning smoke filter of the invention taken approximately on the line II—II of FIG. 1.

FIG. 3 is another sectional view of the self-cleaning smoke filter of the invention taken approximately on the line III—III of FIG. 2.

FIG. 4 is a further sectional view of the self-cleaning smoke filter of the invention taken approximately on the line IV—IV of FIG. 2.

FIG. 5 is still another sectional view of the self-cleaning smoke filter of the invention taken approximately on the line V—V of FIG. 4.

Finally, FIG. 6 is a sectional view of a small portion of the smoke filter of the invention taken approximately on the line VI—VI of FIG. 5.

DETAILED DESCRIPTION OF THE EXEMPLARY EMBODIMENT

Referring to FIGS. 1-3, the self-cleaning smoke filter of the invention is designated generally by reference numeral 10. Smoke filter 10 comprises a channel 11, fabricated from sheet metal or some similar material. Channel 11 is preferably of square cross-section and has four longitudinal sides 13, 14, 16 and 17 angularly disposed relative to the horizontal preferably at an angle of 45°. Sides 13, 14, 16 and 17 are preferably rectangular, whereby channel 11 assumes the geometrical form known as a parallelepiped. As shown in FIG. 1, sides 13 and 14 of channel 11 converge to form a top 12 and, similarly, sides 16 and 17 converge to form a bottom 15.

Channel 11 further includes an outlet port 19, and an inlet port 18 which, in the anticipated use of smoke filter 10, cooperates with a source of gaseous emissions (not shown). One such source of gaseous emissions could be the combustion chamber of a fossil fuel fired electric power generating plant. These gaseous emissions, sometimes referred to colloquially as smoke, are received at inlet port 18, and typically contain contaminants such as oxides of nitrogen, sulfur oxides, particulate matter, and the like.

Secured to channel 10 are spray means 20, adapted to produce a cleansing spray applicable to the gaseous emissions entering channel 10 through inlet port 18. Spray means 20 include a supply line 25 coupled to a source of water or other fluid (not shown). Supply line 25 is connected through a coupling 28 to an interior distribution line 21 secured near top 12 of channel 11. Distribution line 21 is disposed immediately beyond inlet port 18 and has a plurality of spray lines 22 and 23 extending therefrom. Each of spray lines 22 extend perpendicularly from distribution line 21 along the interior of longitudinal side 13 and are secured thereto, while spray lines 23 extend perpendicularly from distribution line 21 along the interior of longitudinal side 14, and are secured thereto. As shown in FIG. 3, spray lines 22 and 23 have a plurality of spray nozzles 24 located at spaced intervals along their respective lengths. Further, as shown most clearly in FIG. 2, spray lines 22 and 23 are staggered relative to each other, and preferably cleanse the gaseous emissions entering through inlet port 18 with several sheets of water comprising a cleansing spray emanating from nozzles 24.

In the embodiment illustrated, the water thus is discharged in a plurality of planes spaced in the direction of the gas flow through the structure, substantially normal thereto with the water being discharged in said planes in alternately opposite directions, which, in the embodiment illustrated, are at 45° with respect to the vertical. The water should be discharged at a pressure sufficient to insure a complete coverage of the discharge plane involved, driving pollutants to the bottom walls and creating a flushing action on the bottom wall impacted by the water. For example, if the longitudinal sides of the structure have a five foot lateral dimension, the water pressure, with suitable nozzle dimensions preferably should be at least 50 psi.

Much of the water-soluble sulfur, associated with sulfur oxide pollutants, is removed from the gaseous emissions upon being contacted with the cleansing spray from nozzles 24. In the preferred embodiment of the invention, a supply pump 29 is disposed along supply line 25 to force the cleansing spray through nozzles 24 at the desired relatively high pressure.

Still referring to FIGS. 1-3, there is shown serpentine baffle means 30 disposed inside channel 11 immediately beyond spray means 20. Baffle means 30 are fabricated from sheet metal or some similar material, and in the preferred embodiment of the invention, include a first row of baffles 31 and a second row of baffles 42. Each row 31 and 42 includes a plurality of baffles secured between longitudinal side 13 and a trough 64 or 65, respectively, attached to side 17. Further each baffle in rows 31 and 42 is angularly disposed relative to the horizontal. For example, row 31 includes a baffle 32, having a straight section 33, which in cross-section extends at angle, preferably of 45° relative to longitudinal sides 14 and 16. Baffle 32 also has a curled section 34 formed integrally with straight section 33 and looping back relative thereto as shown in FIG. 2.

A second baffle 35, disposed in spaced relationship relative to baffle 32, has an L-shaped section 36, the longest leg of which extends parallel to the straight section 33 of baffle 32. Baffle 35 further has an integral curled section 37 conforming to the shape of, and disposed in spaced relationship with curled section 34 of baffle 32. A third baffle 38, having an L-shaped section 39 and a curled section 40, is substantially identical in shape to baffle 35, and is disposed in spaced relationship therewith. Baffles 35 and 38 are secured between longitudinal sides 13 and 17 in the same manner as baffle 33. Moreover, the longest legs of L-shaped sections 36 and 39 of baffles 35 and 38, respectively, are angularly disposed in transverse cross-section, preferably at a 45° angle, relative to longitudinal sides 14 and 16. As shown best in FIG. 5, curled sections 34, 37 and 40 of baffles 32, 35 and 38, respectively, define gutters 49 which, empty via respective trough openings 63, into trough 64. Trough 64 terminates in a trough outlet 66 which cooperates with one of the drain openings 68.

First row 31 of baffle means 30 finally includes a fourth baffle 41, consisting of a straight end section, which is also secured between longitudinal side 13 and trough 64. Baffle 41 extends from longitudinal side 16, preferably at a 135° angle, and is therefore perpendicular to both straight section 33 of baffle 32, and the longest legs of L-shaped sections 36 and 39 of baffles 35 and 38, respectively.

It will be apparent from the above that the baffle members form a plurality of inlet passageways C common to the inflow of both gas and liquid into the baffle means, each common passageway being intersected by a gas passageway G, with a liquid passageway L extending in the entering direction. The liquid passageway thus conducts the entering liquid directly into the respective gutters 49, while the water entering the baffle means may pass directly into the gutter, with the gas being drawn transversely thereto through the reentrant gas passageways.

As mentioned hereinbefore, baffle means 30 preferably includes a second row of baffles 42, secured inside channel 11 between longitudinal side 13 and trough 65 in substantially the same manner as the baffles comprising row 31. It should be noted, however, that even though the number of rows, and the precise number of baffles shown herein are preferred, these specific numbers should not be construed as limitative. Thus, in the preferred embodiment, row 42 includes a first baffle 45, a second baffle 46 and a third baffle 47. Baffle 45 has a straight section and an integral curled section similar in shape to baffle 32; baffle 46 has an L-shaped section and a curled section similar in shape to baffle 35; and baffle 47 consists of a straight end section, longer though similar in shape to baffle 41. Unlike first row 31, however, second row 42 has only one baffle having an L-shaped section. As explained in greater detail hereinafter, the serpentine configuration of baffle means 30 serves as a trapping and filtering network through which the gaseous emissions entering input port 18 must pass en route to outlet port 19.

LIke the baffles in row 31, baffles 45 and 46 in second row 42 of baffle means 30 have integrally formed gutters 49. Gutters 49 terminate in trough openings 63 of trough 65. Trough 65 is secured to longitudinal wall 17 in substantially the same manner as trough 64, and likewise terminates in a drain outlet 67, which likewise cooperates with one of drain openings 68.

Water is adapted to be removed from the channel 11 by suitable drain means 60 disposed at the junction of the side walls 16, 17 of the bottom 15, which in the embodiment illustrated comprises two drain members or channels 61a and 61b. The drain channels each are suitably secured to flanges defining the elongated drain openings 68. As will be apparent from FIGS. 2 and 4, the drain channel 61a is adapted to receive water and waste materials from the section 11a of the channel 11, while drain channel 61b is adapted to receive water and waste materials from the section 11b, and in particular from the troughs 64 and 65 and intermediate portion of the channel section 11b.

Each drain channel is connected by a respective drain pipe 62 for ultimate discharge to a suitable location, the pipes 62, as illustrated in FIG. 1, preferably being connected to a suitable pump 69 to insure adequate removal of the water, particulate matter and pollutants from the drain channels.

Preferably the channel 11 is made in two sections 11a and 11b, having mating flanges 11c received together by suitable means, for example bolts, with suitable gasket means interimposed between the flanges.

As explained hereinbefore, the gaseous emissions, after passing through baffle means 30, escape from channel 11 through outlet port 19. A stack 50, shown in FIG. 2, cooperates with outlet port 19 and provides an outlet 52 to the ambient air. Exhaust means, such as a centrifugal impeller fan 51, are used for drawing the gaseous emissions through channel 11 and outlet port 19. In the preferred embodiment, fan 51 is disposed inside stack 50 in alignment with outlet port 19, though, without departing from the scope of the invention, fan 51 could be located inside channel 11 or, by means of suitable duct work (not shown), could be installed elsewhere as well.

The manner in which the smoke filter of the invention removes particulate matter and other pollutants from gaseous emissions, while simultaneously preventing particulate buildup, can now be explained by reference to FIGS. 2 and 5. In particular, gaseous emissions contaminated by particulate matter and other pollutants such as oxides of sulfur, enter channel 11 through input port 18, and are immediately subject to several successive sheets of water emerging from spray nozzles 24. Some of the pollutants, such as the sulfur associated with the oxides thereof, are immediately dissolved by the water, separated from the gaseous emissions, and dropped to bottom 15 of channel 11. Drains 60 then serve to pass the water-soluble sulfur and the excess water emanating from spray nozzles 24 out of channel 11 in a manner explained hereinbefore.

Some of the water from spray nozzles 24 also adheres to the particulate matter associated with the gaseous emissions which are drawn through channel 11 by exhaust means such as centrifugal impeller fan 51 at exit port 19. As the emissions pass through channel 11, they come in contact with baffle means 30. The angularly disposed, serpentine configuration of baffle means 30 causes the gaseous emissions to contact a maximum baffle area, and upon contact, the wettened particulate matter adheres to the baffles. The gaseous emissions, now separated from the particulate matter, continues through channel 11, escaping through outlet port 19 and ultimately into the ambient air. The water, and the particulate matter previously associated with the gaseous emissions, remain trapped inside channel 11 by baffle means 30.

As increasing amounts of water and wettened material are passed through channel 11, baffle means 30 become increasingly wetter. As a result, water starts dripping down the surfaces of the baffles, loosening the particulate matter adhering thereto. Eventually, the water and particulate matter is washed down the baffles along gutters 49. The combined material then passes through trough openings 63 and proceeds into trough 64, 65. When the water and material reach bottom 15 of channel 11, they exit through trough outlets 66, 67 where they are removed through drains in a manner described hereinbefore. As a result, particulate buildup on baffle means 30 is greatly reduced, and proper circulation of gaseous emissions through channel 11 is maintained.

As explained hereinbefore, the centrifugal impeller fan 51, preferably disposed in outlet port 19, serves to draw the gaseous emissions through channel 11 and into stack 50. But for the serpentine angularly disposed configuration of baffle means 30, however, some of the water from spray nozzles 24 could undesirably be drawn into stack 50 as well. This adverse effect is averted by the disposition and shape of the individual baffles comprising baffle means 30, whereby the cleansed gaseous emissions can pass through the baffles, but the water is trapped thereby.

Though the embodiment set forth in this detailed description is preferred, numerous modifications and improvements which do not part from the scope of the invention may become apparent to those skilled in the art. All such modifications and improvements within the scope of the invention are intended to be covered by the appended claims.

I claim:

1. A channel for removing contaminants from gases having an input port adapted to receive said gases, and an exit port adapted to expel said gases; said channel comprising a first pair of adjacent longitudinal sides forming a V-shaped bottom portion in said channel, and a second pair of adjacent longitudinal sides forming an inverted V-shaped top portion in said channel;

liquid dispensing means disposed between said input port and said exit port for subjecting said gases to a liquid stream to wet said contaminants;

baffle means disposed within said channel between said liquid dispensing means and said exit port for simultaneously passing said gases to said exit port and trapping said wet contaminants; said baffle means defining downwardly extending gutter means for carrying said wet contaminants trapped by said baffle means toward said bottom portion of said channel; said baffle means having a first row comprising: a first baffle having a straight section extending from one of said longitudinal sides comprising said top portion, and a first curled section looping back relative to said straight section; a second baffle having a first L-shaped section in spaced relationship from said curled section, and a second curled section looping back relative to said first L-shaped section; a third baffle having a second L-shaped section in spaced relationship from said second curled section, and a third curled section looping back relative to said second L-shaped section; and a fourth baffle comprising an end section extending from the other longitudinal side comprising said top portion;

trough means, secured to one of said first pair of adjacent sides, cooperating with said gutter means for receiving said contaminants; and drain means, disposed in said bottom portion, cooperating with said trough means for carrying off said contaminants, thereby preventing buildup of said contaminants inside said channel.

2. The channel set forth in claim 1 further includes exhaust means, cooperating with said channel, for drawing said gases through said channel and out said exit port.

3. The channel recited in claim 2 wherein said exhaust means comprise a fan.

4. The channel recited in claim 1 wherein said liquid dispensing means further include a first plurality of nozzled lines, secured to one of said longitudinal sides comprising said top portion, and a second plurality of nozzled lines secured to the other one of said longitudinal sides comprising said top portion.

5. The channel recited in claim 4 wherein said first plurality of nozzled lines is staggered relative to said second plurality of nozzled lines.

6. The channel recited in claim 1 wherein said baffle means include a plurality of rows similar to said first row.

7. A structure for removing contaminants from gases, comprising a channel structure provided with an inlet port for the entrance of such gases, and an outlet port for the exit of such gases, and having a first pair of adjacent longitudinal sides forming a V-shaped bottom portion in said channel, and a second pair of adjacent longitudinal sides connected to said bottom portion and forming an inverted V-shaped top portion in said channel;

liquid dispensing means disposed within said channel between said inlet port and said outlet port for subjecting said gases to a liquid stream and thereby wet said contaminants;

baffle means having an inlet side and an outlet side, disposed within and supported by said channel with said baffle means disposed between said liquid dispensing means and said outlet port for simultaneously passing said gases to said outlet port and trapping said wet contaminants; said baffle means comprising a plurality of cooperable baffle members disposed in generally side-by-side relation and extending across the channel, to define a plurality of inlets, each common to both gas and liquid, a plurality of gas outlets, a plurality of downwardly extending gutter means, and a plurality of interconnecting passageways, said inlets being disposed in a common plane and the gas outlets being disposed in a common plane, which planes extend, in spaced parallel relation, normal to the flow direction through the channel from inlet to outlet thereof, each common inlet being disposed to direct gas and liquid into a cooperable common gas-liquid passageway, a passageway connecting said common passageway with a cooperable gutter means to provide, with the cooperable common passageway, a liquid flow in a direct line from the cooperable common inlet to said cooperable gutter means, and a gas passageway connecting the cooperable common passageway with a cooperable gas outlet, said gas passageway intersecting said common passageway at one side thereof, whereby gas will leave said common passageway in a flow direction transverse to the liquid flow direction to the associated gutter means, the latter being operative to carry wet contaminants, trapped by said baffle means, toward said bottom portion of said channel;

trough means, secured to one of said first pair of adjacent channel sides, cooperating with said gutter means for receiving said contaminants; and drain means, disposed in said bottom portion and communicating with said trough means for carrying off said contaminants, thereby preventing buildup of said contaminants inside said channel.

8. A structure according to claim 7, wherein said baffle members are disposed at an angle of approximately 45° with respect to the horizontal.

9. A structure according to claim 8, wherein said gas and liquid passageways, as viewed in transverse cross section extend at an angle of approximately 45° with respect to said flow direction whereby gas and entrained liquid impinges upon said baffle members.

10. A structure according to claim 9, wherein said gutter means are disposed at the lowermost edges of the associated baffle member.

11. A structure according to claim 10, wherein two series of baffle members are employed, disposed one behind the other in said flow direction.

12. A structure according to claim 7, wherein two series of baffle members are employed, disposed one behind the other in said flow direction.

13. A structure according to claim 7, wherein each of said longitudinal sides of said channel extends at an angle of 45° with respect to the vertical.

14. A structure according to claim 7, wherein said liquid dispensing means is disposed to direct liquid in a plurality of planes spaced in the direction of gas flow through the structure from the inlet port to the outlet port thereof, with the liquid in adjacent planes being discharged in transverse directions.

15. A structure according to claim 14, wherein said discharge planes extend normal to said gas flow direction and said transverse direction of the liquid discharged in said planes is alternately oppositely directed at 45° with respect to the vertical.

16. A structure according to claim 15, wherein each of said longitudinal sides of said channel extends at an angle of 45° with respect to the vertical.

17. A structure according to claim 16, wherein said baffle members are disposed at an angle of approximately 45° with respect to the horizontal.

18. A structure according to claim 17, wherein said gas and liquid passageways, as viewed in transverse cross-section extend at an angle of approximately 45° with respect to said flow direction whereby gas and entrained liquid impinges upon said baffle members.

* * * * *